United States Patent
Petyushko et al.

(10) Patent No.: US 8,817,970 B2
(45) Date of Patent: Aug. 26, 2014

(54) FAST ECHO GAIN CHANGE DETECTION

(75) Inventors: Alexander A. Petyushko, Bryansk (RU); Dmitry N. Babin, Moscow (RU); David G. Shaw, Nazareth, PA (US); Ivan L. Mazurenko, Moscow region (RU); Pavel A. Aliseychik, Moscow (RU)

(73) Assignee: LSI Corporation, San Jose, CA (US)

( * ) Notice: Subject to any disclaimer, the term of this patent is extended or adjusted under 35 U.S.C. 154(b) by 99 days.

(21) Appl. No.: 13/295,385

(22) Filed: Nov. 14, 2011

(65) Prior Publication Data

US 2012/0288084 A1    Nov. 15, 2012

(30) Foreign Application Priority Data

May 12, 2011    (RU) .................... 2011118860

(51) Int. Cl.
  *H04M 1/00*    (2006.01)
(52) U.S. Cl.
  USPC ..................... 379/406.08; 370/286
(58) Field of Classification Search
  CPC ..................................... H04M 9/082
  USPC ............ 379/406.01–406.16; 381/71.1–71.4; 370/286–296; 455/570
  See application file for complete search history.

(56) References Cited

U.S. PATENT DOCUMENTS

| | | | | |
|---|---|---|---|---|
| 5,274,705 A * | 12/1993 | Younce et al. | ........... | 379/406.05 |
| 5,343,521 A * | 8/1994 | Jullien et al. | ............. | 379/406.07 |
| 5,825,753 A | 10/1998 | Betts et al. | .................... | 370/289 |
| 6,125,179 A * | 9/2000 | Wu | ......................... | 379/388.01 |
| 6,263,078 B1 | 7/2001 | McLaughlin et al. | ........ | 379/411 |
| 6,804,203 B1 * | 10/2004 | Benyassine et al. | .......... | 370/286 |
| 6,990,195 B1 * | 1/2006 | LeBlanc et al. | .......... | 379/406.08 |
| 7,613,291 B1 | 11/2009 | Benyassine et al. | ..... | 379/406.08 |

OTHER PUBLICATIONS

"Series G: Transmission System and Media, Digital Systems and Networks", ITU-T Telecommunication Standardization Sector of ITU, Mar. 2009, 134 pages.

Gansler, T., et al., "Double-talk robust fast converging algorithms for network echo cancellation", IEEE Xplore Digital Library, 1999, 1 page.

\* cited by examiner

*Primary Examiner* — Fan Tsang
*Assistant Examiner* — Akelaw Teshale
(74) *Attorney, Agent, or Firm* — Christopher P. Maiorana, PC

(57) ABSTRACT

An apparatus generally having a first circuit and a second circuit is disclosed. The first circuit may be configured to synthesize a first vector by filtering a second vector based on a third vector. The second circuit may be configured to (i) generate a gain corresponding to a fourth vector, (ii) compare the gain to a plurality of thresholds and (iii) update the third vector as a function of the gain where the compare determines that the gain is not between the thresholds. The fourth vector may be received from a network as an echo of the second vector.

20 Claims, 6 Drawing Sheets

FAST ECHO GAIN CHANGE DETECTION

This application claims the benefit of Russian Application No. 2011118860, filed May 12, 2011 and is hereby incorporated by reference in its entirety.

FIELD OF THE INVENTION

The present invention relates to echo gain in electrical telephone networks generally and, more particularly, to a method and/or apparatus for implementing a fast echo gain change detection.

BACKGROUND OF THE INVENTION

Conventional echo cancellers have a linear filter and a nonlinear processor (i.e., NLP) following the filter. A signal received via a network and processed by the linear filter is nonlinearly attenuated with the NLP in certain talking modes (i.e., far end speech). The presence of the NLP increases an echo return loss enhancement (i.e., ERLE), but at the same time decreases interactivity of a conversation (i.e., double-talking performance). Therefore, a common echo canceller seeks an optimal point between the interactivity and the ERLE.

Under steady state conditions, the echo canceller tracks only slow changes of the echo path and removes most of the echoes. However, quick changes in the magnitude of the echo level in the received signal occur from time to time. For example, a quick change occurs if somebody picks up or replaces a parallel handset in a house. Such situations produce considerable changes in an echo path of the network. Typical echo cancellers re-converge relatively slowly in such conditions, so a significant degradation in the system performance exists until the echo canceller re-converges on the new echo path characteristics.

An International Telecommunication Union-Telecommunications Standardization Sector (ITU-T) Recommendation G.168 includes a number of tests for rapid convergence and re-convergence in different modes, and certain echo path changes. ITU-T G.168 test No. 2 concerns convergence and steady state residual and returned echo level tests. A part of the tests imply that once the echo path change occurs, an echo path change (i.e., EPC) procedure and re-converge is run and corrections accomplished within a specific amount of time.

It would be desirable to implement a fast echo gain change detection.

SUMMARY OF THE INVENTION

The present invention concerns an apparatus generally having a first circuit and a second circuit. The first circuit may be configured to synthesize a first vector by filtering a second vector based on a third vector. The second circuit may be configured to (i) generate a gain corresponding to a fourth vector, (ii) compare the gain to a plurality of thresholds and (iii) update the third vector as a function of the gain where the compare determines that the gain is not between the thresholds. The fourth vector may be received from a network as an echo of the second vector.

The objects, features and advantages of the present invention include providing a fast echo gain change detection that may (i) provide a theoretical optimal solution based on a least-squares method, (ii) be implemented using an Infinite Impulse Response filter, (iii) allow flexible tuning in terms of which frames of an input signal may be processed, (iv) make echo gain correction decisions based on simple threshold logic, (v) multiply a filter vector by a gain factor, (vi) make the echo gain change detection (e.g., EGCD) in a short amount of time, (vii) be implemented with a low complexity in terms of the number of processing cycles and/or (viii) allow a fixed point implementation on a processor.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention concern situations where a nature of an echo does not change but a level (gain) of the echo does change. For example, if a parallel telephone is picked up off the hook during an ongoing telephone call the level of the echo may change. In such situations, restarting an adaptation routine in an echo canceller to adapt filter coefficients to the new level may not be desirable as the adaptation commonly takes valuable time and/or may not react fast enough in compensating for the echo path change. In some embodiments, a gain factor may be applied to tap coefficients of an adaptive linear filter of an echo canceller to provide good quality echo cancellation for a limited amount of time. In other embodiments, the gain factor may be applied to a synthesized echo generated in the echo canceller to provide the echo cancellation.

Figure 1:
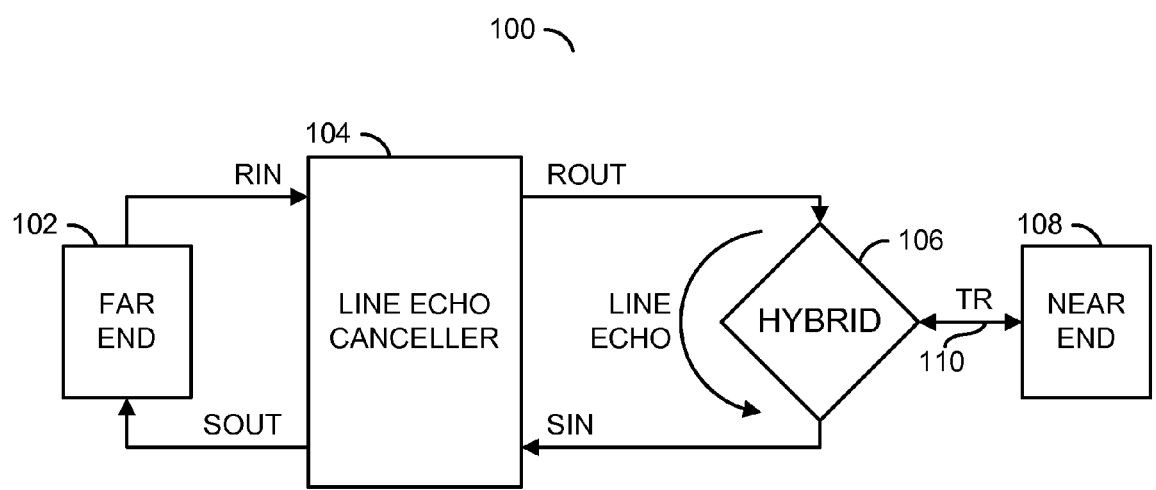
FIG. 1 is a block diagram of a system.

Referring to FIG. 1, a block diagram of a system 100 is shown. The system (or architecture) 100 generally comprises a block (or circuit) 102, a block (or circuit) 104, a block (or circuit) 106, a block (or circuit) 108 and a network (or transmission line) 110. The circuits 102 to 110 may represent modules and/or blocks that may be implemented as hardware, firmware, software, a combination of hardware, firmware and/or software, or other implementations. The system 100 may be operational to perform a fast echo gain change detection and compensation.

A signal (e.g., RIN) may be generated by the circuit 102 and received by the circuit 104. The circuit 104 may generate a signal (e.g., SOUT) received by the circuit 102. A signal (e.g., ROUT) may be generated by the circuit 104 and transferred to the circuit 106. The circuit 106 may generate a signal (e.g., SIN) that is received by the circuit 104. A bidirectional signal (e.g., TR) is generally exchanged between the circuit 106 and the circuit 108 via the network 110.

The circuit 102 generally implements a far end circuit. The circuit 102 may be operational to send and receive data to and from the circuit 108. The receive data may be received by the circuit 102 from a "far" user of the system 100. The far user is generally located proximate (or adjacent) the circuit 102. The send data may be sent to the far user by the circuit 102. In a receive path, the receive data may initially be transferred from the circuit 102 to the circuit 104 in the signal RIN. From the circuit 104, the receive data may be presented to the circuit 106 in the signal ROUT. From the circuit 106, the receive data may be transferred via the network 110 in the signal TR and finally received by the circuit 108. In a send path, the send data is generally sent by the circuit 108 to the circuit 106 in the signal TR. From the circuit 106, the send data may be presented to the circuit 104 in the signal SIN. The send data may finally be transferred from the circuit 104 to the circuit 102 in the signal SOUT. In some embodiments, the circuit 102 may include a copy of the circuits 104, 106, 108 and 110.

The circuit 104 may implement a line echo cancelling circuit. The circuit 104 is generally operational to transfer data between the circuits 102 and 106, filter the data, perform network echo cancellation on the send data as received in the signal SIN, update the echo cancellation functionality to converge with the current echo characteristics of the circuit 106 and the network 110, train the echo cancellation functionality to learn new echo characteristic and detect echo gain changes in the circuit 106 and/or the network 110. The detection of the fast echo gain changes generally includes (i) synthesizing a predicted echo vector by filtering an input vector based on a filter vector, (ii) generating a gain corresponding to a echo vector received from the circuit 106 and/or the network 110, (iii) comparing the gain to a plurality of thresholds and (iv) updating the filter vector as a function of the gain where the comparing determines that the gain is not between the thresholds.

The circuit 106 generally implements a hybrid circuit. The circuit 106 may be operational to route the receive data in the signal ROUT to the signal TR on the network 110 and route the send data in the signal TR to the signal SIN. In some embodiments, the circuit 106 may be implemented as a normal 4-wire to 2-wire hybrid circuit. The 2-wire interface generally connects to the network 110. Half of the 4-wire interface may receive the signal ROUT. The other half of the 4-wire interface may present the signal SIN. In some situations, the circuit 106 may leak some of the receive data from the signal ROUT to the signal SIN thereby creating the echo. In common schemes, multiple circuits 106 may be distributed throughout the system 100. In some embodiments, one or more additional circuits 106 may exist between the circuits 104 and 108.

Each of the multiple circuits 106 may create an echo. The circuit 108 generally implements a near end circuit. The circuit 108 may be operational to communicate with the circuit 106 via the network 110. The receive data generated by the far user may be presented to a "near" user of the system 100 by the circuit 108. The near user may be located proximate (or adjacent) the circuit 108. The send data is generally received by the circuit 108 from the near user and transmitted to the far user at the circuit 102. In some embodiments, the circuit 108 may include a copy of the circuits 102, 104, 106 and 110.

The network 110 may implement an acoustic network. In some embodiments, the network 110 may be a plain old telephone system telephone line (e.g., Public Switched Telephone Network) Other network designs may be implemented to meet the criteria of a particular application.

The network 110 may be considered to have a current condition among several possible conditions (or states or modes) at any given time. The possible conditions include, but not limited to, a talk condition, a listen condition, a double talk condition, a silence condition and a tone condition. The talk condition may also be known in the field as a far end talk (or speech) condition. The listen condition may also be known in the field as a near end talk (or speech) condition. In some circumstances, two or more of the conditions may exist on the network 110 at the same time (e.g., the tone condition and the talk (far end speech) condition where the far user speaks during the tone condition).

While in the talk condition (far end speech), the far user is generally speaking and the near user may be silent. Since the only data on the network 110 in the talk condition originates from the circuit 102, the circuit 104 may (i) reduce an actual echo by applying synthesized echo cancellation data, (ii) update (converge) the echo cancellation functionality, (iii) detect changes in the echo path of the circuit 106 and/or the network 110 and (iv) train the echo cancellation functionality to match the echo path.

While in the listen (near end talk) condition, the near user may be speaking and the far user may be silent. While in the silent condition, both the far user and the near user may be silent. If the far user is silent, the signal ROUT generally contains little or no data that could create an echo. Therefore, circuit 104 may stop the updates of the echo cancellation functionality and stop any training in progress. Under the silent condition, the signal SOUT may be substantially similar to the signal SIN.

While in the double talk condition, both the far user and the near user may be speaking. Since the circuit 104 cannot distinguish far user data from near user data in the signal SIN under the double talk condition, the circuit 104 may stop updating the echo cancellation functionality and stop any training in progress. Under the double talk condition, the signal SOUT may be substantially similar to the signal SIN, with possibly some residual of the far talker. In some situations, the echo cancellation may continue while in the double talk condition as the circuit 104 may reasonably estimate the echo components in the signal SIN caused by the outgoing data in the signal ROUT. While in the tone condition, the signal TR generally carries a continuous tone. While the tone is present on the network 110, the circuit 104 may stop the updating of the echo cancellation functionality and stop any training that may be in progress.

Figure 2:
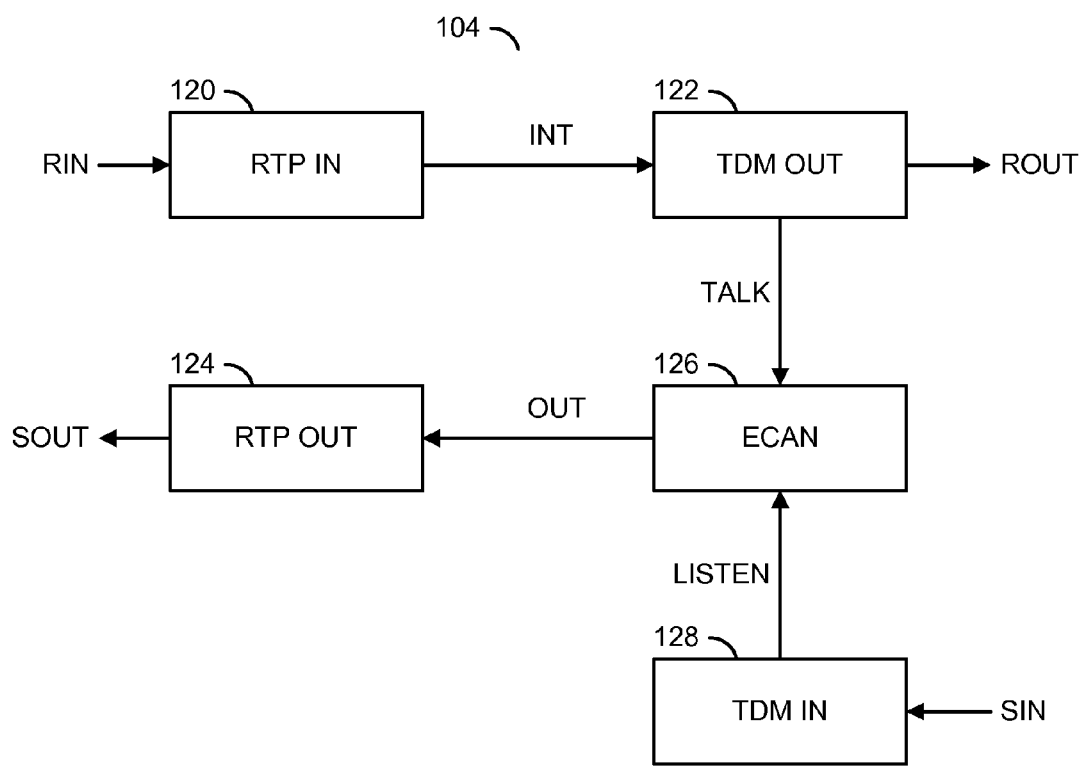
FIG. 2 is a block diagram of an example implementation of a line echo cancelling circuit in the system.

Referring to FIG. 2, a block diagram of an example implementation of the line echo cancelling circuit 104 is shown. The circuit (or device, apparatus or integrated circuit) 104 generally comprise a block (or circuit) 120, a block (or circuit) 122, a block (or circuit) 124, a block (or circuit) 126 and a block (or circuit) 128. The circuits 120 to 128 may represent modules and/or blocks that may be implemented as hardware, firmware, software, a combination of hardware, firmware and/or software, or other implementations.

The circuit 120 generally receives the signal RIN. A signal (e.g., INT) may be generated by the circuit 120 and transferred to the circuit 122. The circuit 122 may generate the signal ROUT. A signal (e.g., TALK) may be generated by the circuit 122 and received by the circuit 126. The circuit 128 generally receives the signal SIN. A signal (e.g., LISTEN) may be generated by the circuit 128 and presented to the circuit 126. The circuit 126 may generate a signal (e.g., OUT) that is transferred to the circuit 124. The circuit 124 may generate the signal SOUT.

The circuit 120 generally implements a receiver circuit. The circuit 120 may be operational to (i) receive the data from the signal RIN and (ii) convert the data into an intermediate format. While in the signal RIN, the data is generally coded per a local protocol. In some embodiments, the local protocol may be a Real-time Transport Protocol (RTP). The intermediate format is generally suitable for use by the other circuits within the circuit 104. Data in the intermediate format may be presented in the signal INT to the circuit 122. Other protocol conversions may be implemented to meet the criteria of a particular application. The circuit 122 generally implements a converter circuit.

The circuit 122 may be operational to (i) convert the data from the intermediate format and (ii) transmit the data in the signal ROUT. While in the signal ROUT, the data may be coded per a network protocol. In some embodiments, the network protocol may be a Time Division Multiplexing (TDM) protocol. Data in the protocol is presented to the circuit 106 in the signal ROUT. Other protocol conversions may be implemented to meet the criteria of a particular application. The circuit 122 may be further operational to transfer the data received in the signal INT to the circuit 126 via the signal TALK. The data in the signal TALK may be representative of the data when transmitted on the network 110 from the circuit 106.

The circuit 124 may implement another converter circuit. The circuit 124 is generally operational to (i) convert the data received in the signal OUT and (ii) transmit the data in the signal SOUT. While in the signal SOUT, the data is generally coded per the local protocol (e.g., same protocol as the signal RIN). Other protocol conversions may be implemented to meet the criteria of a particular application.

The circuit 126 generally implements an echo cancelling (ECAN) circuit. The circuit 126 may be operational to detect the condition of the circuit 106 and/or the network 110, model an echo path of the circuit 106 and the network 110 as seen from the circuit 104, cancel echoes within the signal SIN, update the echo cancellation functionality and train the echo cancellation functionality. The echo cancelled data may be presented in the signal OUT to the circuit 124.

The circuit 128 may implement another receiver circuit. The circuit 128 is generally operational to (i) receive the data from the signal SIN and (ii) convert the data into the intermediate format. While in the signal SIN, the data may be coded per the network protocol (e.g., same protocol as the signal ROUT). The data is generally presented in the signal LISTEN to the circuit 126. Other protocol conversions may be implemented to meet the criteria of a particular application.

Figure 3:
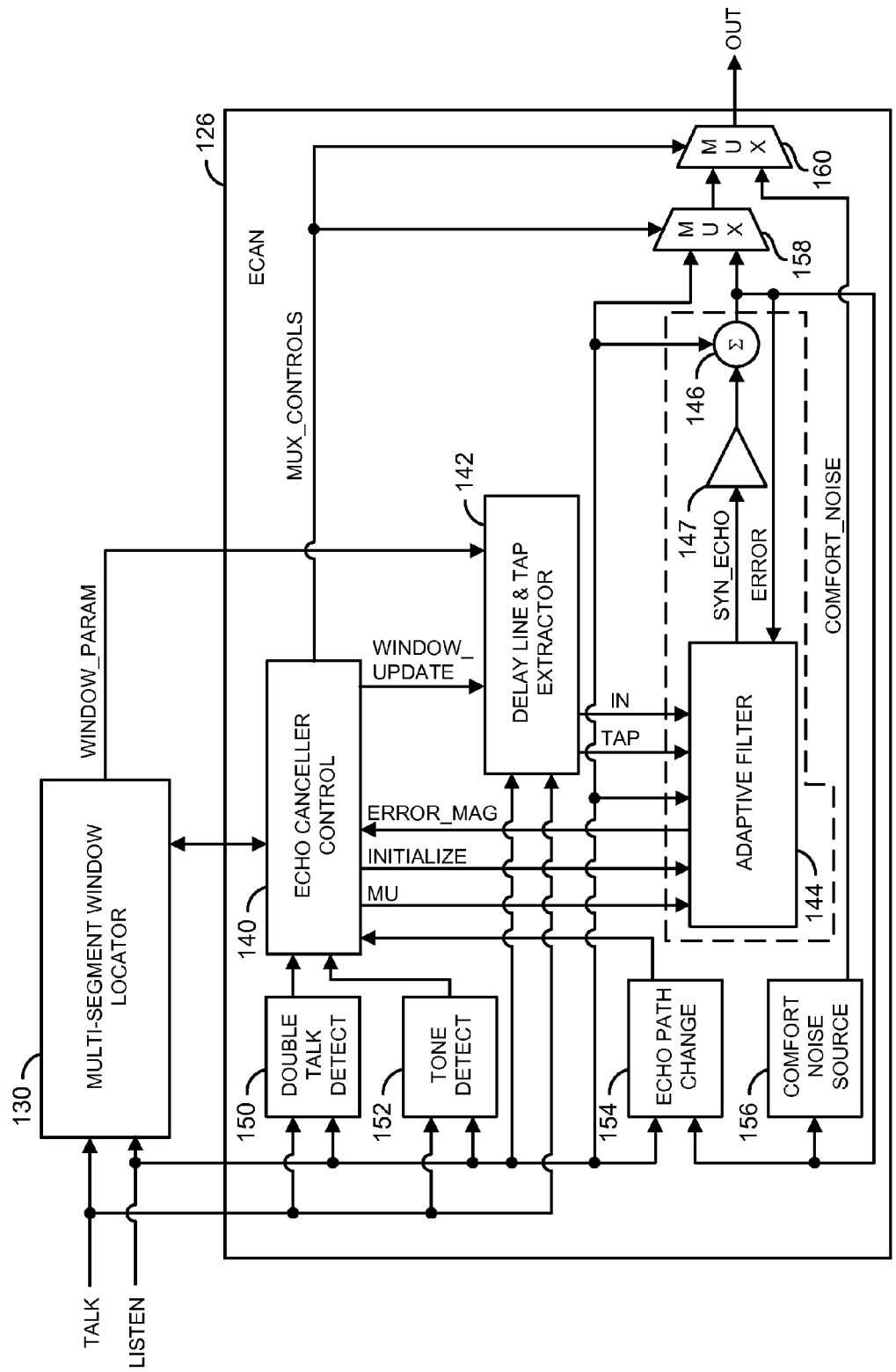
FIG. 3 is a detailed block diagram of the line echo cancelling circuit.

Referring to FIG. 3, a detailed block diagram of the circuit 126 is shown with an accompanying block (or circuit) 130. The circuit (or module, device, apparatus or integrated circuit) 126 generally comprises a block (or circuit) 140, a block (or circuit) 142, a block (or circuit) 144, a block (or circuit) 146, a block (or circuit) 147, a block (or circuit) 150, a block (or circuit) 152, a block (or circuit) 154, a block (or circuit) 156, a block (or circuit) 158 and a block (or circuit) 160. The circuits 130 to 160 may represent modules and/or blocks that may be implemented as hardware, firmware, software, a combination of hardware, firmware and/or software, or other implementations.

Each signal TALK and LISTEN may be received by the circuits 130, 142, 150, 152 and 154. The signal LISTEN may also be received by the circuits 144, 146 and 158. The circuit 160 may generate and present the signal OUT. A signal (e.g., MU) may be generated by the circuit 140 and presented to the circuit 144. A signal (e.g., INITIALIZE) may be generated by the circuit 140 and presented to the circuit 144. The circuit 144 may generate a signal (e.g., ERROR_MAG) received by the circuit 140. A signal (e.g., IN) may be generated by the circuit 142 and received by the circuit 144. The circuit 142 may generate a signal (e.g., TAP) received by the circuit 144. The circuit 144 may generate a signal (e.g., SYN_ECHO) transferred to the circuit 146 via the circuit 147. The circuit 146 may generate a signal (e.g., ERROR) received by the circuits 144, 154, 156 and 158. A signal (e.g., WINDOW_PARAM) may be generated by the circuit 130 and received by the circuit 142. The circuit 140 may generate a signal (e.g., MUX_CONTROLS) that is presented to the circuits 158 and 160. The circuit 140 may generate a signal (e.g., WINDOW_UPDATE) that is transferred to the circuit 142. A signal (e.g., COMFORT_NOISE) may be generated by the circuit 156 and received by the circuit 160. Each circuit 150, 152 and 154 may present a respective signal to the circuit 140. The circuits 140 and 130 may be in communication with each other by a set of several signals.

The circuit 130 generally implements a multi-segment window locator circuit. The circuit 130 may be operational to generate parameters for a multi-segment window based on the data received in the signal TALK and LISTEN. The window parameters may be used to bound a number of input samples used in the echo cancellation. The parameters may be presented to the circuit 142 via the signal WINDOW_PARAM. In some embodiments, the circuit 130 may be switched off (deactivated) while an initial adaptation is being performed. Thereafter, the circuit 130 may be switched on (activated) to find the windows and then switched off again. Similarly, after each echo path change event is detected, the circuit 130 may be switched on to find the windows and then switched off again. Having the circuit 130 switched off generally saves significant processing resources with the present technique.

The circuit 140 generally implements an echo canceller control circuit. The circuit 140 may be operational to control the overall operations to the circuits 126 and 130. The circuit 140 may control the circuits 158 and 160 based on the current condition of the circuit 106, the network 110 and possible data received from external control. Updates to the window may be calculated by the circuit 140 and presented to the circuit 142 via the signal WINDOW_UPDATE. To initialize the circuit 144, the circuit 140 may assert the signal INITIALIZE. The signal MU may be generated by the circuit 140 and presented to the circuit 144 to convey a step-size parameter (e.g., µ). A magnitude of an error between the synthesized echo and the actual echo may be received by the circuit 140 from the circuit 142 via the signal ERROR_MAG.

The circuit 142 may implement a delay line and tap extractor circuit. The circuit 142 is generally operational to buffer a sequence of multiple (e.g., N) input samples from the signal TALK. The samples generally form an input vector (e.g., X). The input vector X may be presented from the circuit 142 to the circuit 144 in the signal IN. The circuit 142 may also be operational to extract tap values based on the window parameters received in the signal WINDOW_PARAM and update information received in the signal WINDOW_UPDATE. The tap values are generally transferred from the circuit 142 to the circuit 144 in the signal TAP.

The circuit 144 generally implements an adaptive filter circuit. The circuit 144 may be operational to filter the input data received in the signal LISTEN to generate a synthesized echo that approximately mimics the echo caused by the circuit 106 and the network 110 and, possibly in part, by the circuit 108. The adaptive filtering is generally based on the tap values received in the signal TAP, the input vector X received in the signal IN, an error value received in the signal ERROR and the step-size parameter µ received in the signal MU.

The circuit 146 generally implements a difference circuit. The circuit 146 may be operational to generate a difference between the synthesized echo received in the signal SYN_ECHO and the actual echo as received in the signal LISTEN. The difference may be the error value in the signal ERROR. In some embodiments, the circuit 146 may be implemented as part of the circuit 144 (see dashed box).

The circuit 147 may be implemented as a variable gain amplifier. The circuit 147 is generally operational to multiply the signal SYN_ECHO by a gain setting (or gain factor) based on the gain factor. In some embodiments, the circuit 147 may be implemented as part of the circuit 144 (see dashed box). In other embodiments, the circuit 147 may be eliminated and the signal SYN_ECHO may be presented directly to the circuit 146.

The circuit 150 generally implements a double talk detection circuit. The circuit 150 may be operational to detect when both the far user and the near user are speaking. Detection of the double talk condition by the circuit 150 may be reported to the circuit 140.

The circuit 152 generally implements a tone detection circuit. The circuit 152 may be operational to detect when one or more specified tones reside on the network 110. Detection of the tone condition by the circuit 152 may be reported to the circuit 140.

The circuit 154 generally implements an echo path change detection circuit. The circuit 154 may be operational to detect when the echo path of the network 110 has experienced a significant change. The detection is generally based on large error values in the signal ERROR while echoes are present in the signal LISTEN. Detection of an echo path change by the circuit 154 may be reported to the circuit 140. The circuit 140 may respond to the report by initiating a training session to learn the modified echo path.

The circuit 156 generally implements a comfort noise source circuit and/or a nonlinear processor. The circuit 156 may be operational to generate comfort noise in the signal COMFORT_NOISE. The comfort noise may be routed to the signal OUT during the far talk condition so that the far user hears something after the nonlinear processing has removed the residual echo. Otherwise, if the far user hears complete silence, the far user may conclude that a connection to the near user has been dropped.

The circuit 158 generally implements a multiplexer circuit. The circuit 158 may be operational to route either (i) the filtered and echo-cancelled send data from the circuit 146 or (ii) bypass the filtering and route the send data directly to the circuit 160. Control of the routing is generally provided by the circuit 140 via the signal MUX_CONTROLS.

The circuit 160 generally implements another multiplexer circuit. The circuit 160 may be operational to route to the signal OUT either (i) the send data from the circuit 158 or (ii) the comfort noise from the circuit 156. Control of the routing may be provided by the circuit 140 via the signal MUX_CONTROLS.

Figure 4:
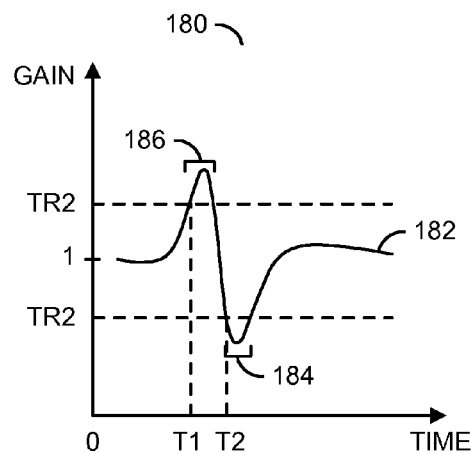
FIG. 4 is a graph of a gain factor as a function of time.

Referring to FIG. 4, a graph 180 of a gain factor as a function of time is shown. The signal TALK may be represented by the vector X. The signal LISTEN may be represented by a vector (e.g., Y) as follows: $Y=(y_1, \ldots, y_i, \ldots, y_N)$. The vector Y generally contains an echo from the signal RIN produced by the line hybrids (e.g., circuits 106) in the network 110. Each component (e.g., $y_i$) of the vector Y may be a value (signed magnitude) of the signal LISTEN at a moment (e.g., i) in time. The value N generally represents the length of an analysis window (e.g., number of samples considered) at a current moment in time.

A vector (e.g., $\hat{Y}$) may be a predicted line echo computed as a convolution of the vector X and a filter vector (e.g., H). The vector $\hat{Y}$ may be defined as follows: $\hat{Y}=X*H=(\hat{y}_1, \ldots, \hat{y}_i, \ldots, \hat{y}_N)$. The filter vector H is generally an N sample long echo path estimate vector. If an echo gain change takes place, the predicted echo should be increased in amplitude by a gain factor (e.g., $\beta$). For example, a real echo (expressed as vector Y) received before the echo gain change generally becomes an echo $\beta Y$ after the echo gain change. Therefore, a "new" predicted echo $\hat{Y}$ may be computed as $\beta\hat{Y}$ to be as close to the real echo as possible. Minimizing errors between the echo vector Y and the predicted echo vector $\hat{Y}$ may be calculated by a least-squares method per equation 1 as follows:

$$C(\beta) = \sum_{i=1}^{N} (y_i - \beta\hat{Y})^2 \rightarrow \text{minimum} \qquad (1)$$

An ideal value of the gain factor $\beta$ should minimize the function $C(\beta)$. To find a best gain factor $\beta$, the function $C(\beta)$ may be differentiated with respect to the gain factor $\beta$ and the derivative may be set to zero (e.g., an optimum condition) per equation 2 as follows:

$$\frac{dC}{d\beta} = 0 \Rightarrow \sum_{i=1}^{N}(y_i - \beta\hat{y}_i)\hat{y}_i = 0 \qquad (2)$$

Solving equation 2 generally produces equation 3 as follows:

$$\beta = \left(\sum_{i=1}^{N} y_i\hat{y}_i\right) \bigg/ \left(\sum_{i=1}^{N} \hat{y}_i^2\right) (*) \qquad (3)$$

Partial sums for the numerator and denominator of (*) may be defined by equations 4 and 5 as follows:

$$A'_n = \sum_{i=1}^{n} y_i\hat{y}_i \qquad (4)$$

$$B'_n = \sum_{i=1}^{n} \hat{y}_i^2 \qquad (5)$$

For a large analysis window (e.g., a large value N), a valuable amount of memory may be consumed storing the above values. Therefore, both the numerator and denominator may use mean sums (e.g, $A_n'/n$ and $B_n'/n$ correspondently) to reduce the memory consumption. An efficient method to compute the mean sums may be to use an Infinite Impulse Response (IIR) filter of first order (e.g., also referred to as an exponential windowing technique). Using the IIR filter, the mean sums may be computed per equations 6 and 7 as follows:

$$A_n = (1-\gamma)A_{(n-1)} + \gamma y_n\hat{y}_n, A_0 = 0 \qquad (6)$$

$$B_n = (1-\gamma)B_{(n-1)} + \gamma \hat{y}_n^2, B_0 = 0 \qquad (7)$$

where a parameter (e.g., $\gamma$) may be a smoothing factor (or value) in a range $0<\gamma<1$. An estimated gain factor (e.g., $\beta_n$) may be calculated. Since $\beta_n' = A_n'/B_n' = (A_n'/n)/(B_n'/n) \approx A_n/B_n = \beta_n$, hereafter the estimated gain factor $\beta_n$ is generally used instead of the optimum theoretical gain factor $\beta$. The estimated gain factor $\beta_n$ may be computed per equation 8 as follows:

$$\beta_n = A_n/B_n \qquad (8)$$

If no change occurs in the echo gain, the estimated gain factor $\beta_n$ is approximately unity (1). Therefore, the circuit 126 may react only if the estimated gain factor $\beta_n$ is significantly lower than unity or significantly higher than unity. To exclude false responses (e.g., incorrectly asserting an EGCD where the echo gain has not changed), multiple (e.g., 2) thresholds (e.g., TR1 and TR2) may be defined such that 0<TR1<1<TR2. If a curve 182 of the gain factor β falls below the threshold TR1 (e.g., in a window 184) or above the threshold TR2 (e.g., in a window 186), the circuit 126 should react at the time moments T1 and T2, correspondently.

Based on experimentation, the estimated gain factor $\beta_n$ does not have to be computed on a sample-by-sample basis. Therefore, a total number of divisions performed by a digital signal processor that calculates the estimated gain factor $\beta_n$ may be reduced. Instead, only the values $A_n$ and $B_n$ may be calculated for each sample. Without a visible loss in quality, the estimated gain factor $\beta_n$ may be computed (updated) on a frame basis (e.g., every 40 samples). Therefore, the above scheme generally reduces the total computational cost because divisions may utilize more processing resources than additions or multiplications.

Having detected an echo gain change, the circuit 126 may either (i) run a full echo path change procedure, (ii) update a vector of filter taps and/or (iii) adjust the gain setting applied to the synthesized echo. Running the full echo path change procedure generally takes a considerable amount time and carries a high computational cost.

Updating the vector of filter taps only involves multiplying each of the elements in the vector by a particular factor. The particular factor is generally a function of the estimated gain factor $\beta_n$. The function may be implemented from among a variety of functions. For example, the function may be implemented as an identity operator as follows: $f(\beta_n)=\beta_n$. In another example, the function may be implemented as a multiplication by a constant (e.g., k) in a range 0<k<1 as follows: $f(\beta_n)=k\beta_n$.

Adjusting the gain setting applied to the synthesized echo may be performed in some embodiments in place of, or in addition to, adjusting each elements in the filter tap vector. The circuit 147 generally amplifies the signal SYN_ECHO by the estimated gain factor $\beta_n$ while the filter tap vector remains unchanged (see equation 1). For fixed point implementations, quantization of the coefficients (taps) may become problematic if the estimated gain factor $\beta_n$ becomes large or small compared with unity. Under such circumstances, the gain setting of the circuit 147 may be returned to a unity gain and the filter taps may be adjusted. Multiple (e.g., two) additional thresholds (e.g., TR3 and TR4) may be established to determine when to adjust the gain setting of the circuit 147 and when to adjust the filter tap vector. The thresholds TR3 and TR4 are generally wider apart than the thresholds TR1 and TR2. Where the estimated gain factor $\beta_n$ is between the thresholds TR3 and TR4, the gain setting of the circuit 147 may be adjusted to account for an echo path gain change. Where the estimated gain factor βn is outside the thresholds TR3 and TR4, the filter tap vector may be adjusted to account for the echo path gain change.

Figure 5:
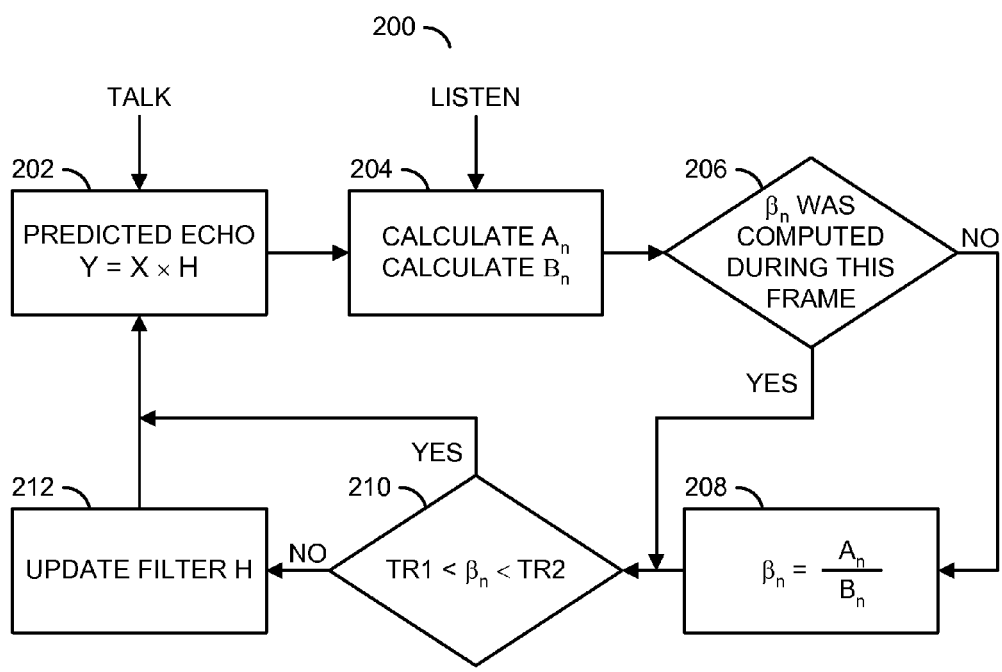
FIG. 5 is a flow diagram of a method to detect an echo gain change.

Referring to FIG. 5, a flow diagram of a method 200 to detect an echo gain change is shown. The method (or process) 200 generally includes a step (or state) 202, a step (or state) 204, a step (or state) 206, a step (or state) 208, a step (or state) 210 a step (or state) 212. The steps 202 to 212 may represent modules and/or blocks that may be implemented as hardware, firmware, software, a combination of hardware, firmware and/or software, or other implementations. The method 200 may be operational to perform a fast echo gain change detection. The method 200 is generally implemented by the circuit 126.

In the step 202, the circuit 144 may generate the predicted echo vector $\hat{Y}$ as follows: $\hat{Y}=X*H$. The calculation is generally a convolution of the signal TALK and the filter vector H.

In the step 204, the circuit 142 may calculate the numerator value $A_n$ and the denominator value $B_n$ on every sample using an exponential windowing technique. Calculation of the value $A_n$ may be per equation 6 and the value $B_n$ may be per equation 7. Once every several samples (e.g., approximately 40 samples or a frame) the circuit 142 may also calculate the gain factor β per equation 3.

A check may be performed by the circuit 142 in the step 206 to determine if the gain factor $\beta_n$ was actually calculated or not. If the gain factor $\beta_n$ was not calculated in the recent past (e.g., within the last frame), the method 200 may proceed to the step 208 (e.g., along the NO branch of the step 206). If the gain factor $\beta_n$ was calculated recently (e.g., the YES branch of the step 206), the method 200 may proceed to the step 210. In the step 208, the circuit 142 may update the gain factor $\beta_n$ per equation 8.

A check may be performed by the circuit 142 in the step 210 to determine if the gain factor $\beta_n$ is between the thresholds TR1 and TR2 or not. If the gain factor $\beta_n$ is smaller than the lower threshold TR1 or bigger than the higher threshold TR2 (e.g., the NO branch of the step 210), the circuit 142 generally concludes that an echo gain change has taken place. Therefore, the method 200 may continue with the step 212. In the step 212, the circuit 142 generally updates the taps presented to the circuit 144 (in the signal TAP) as a function of the gain factor $\beta_n$ per equation 9 as follows:

$$H_i = H_i * f(\beta_n) \tag{9}$$

In some embodiments, the function $f(\beta_n)$ may be a multiplication of each filter tap value by the gain factor $\beta_n$. Other functions may be implemented to meet the criteria of a particular application. Thereafter, the method 200 may return to the step 202 to predict the next echo. If the gain factor $\beta_n$ is between the thresholds TR1 and TR2 (e.g., the YES branch of the step 210), the method 200 may skip the step 212 and return to the step 202 to predict the next echo.

Calculation of each of the numerator value $A_n$ and the denominator value $B_n$ generally takes 2 additions and 2 multiplications if, for example, equations 6 and 7 are re-written as follows:

$$A_n = \gamma(A_{(n-1)} + y_n \hat{y}_n) - A_{(n-1)} \tag{10}$$

$$B_n = \gamma(B_{(n-1)} + \hat{y}_n^2) - B_{(n-1)} \tag{11}$$

If the hardware of the circuit 126 supports multiply-and-accumulate (e.g., MAC) operations, the complexity of the method 200 generally reduces to two MACs. For example, processing of the MAC operations for an 8 kHz (kilohertz) signal may involves 2*(2*8000) clock cycles, which corresponds to approximately 0.04 million cycles per second (e.g., MCPS).

If a division operation costs D clock cycles, and a frame size is M, a number of clock cycles used to perform a division for the 8 kHz signal may be expressed as D*8000/M. Assuming typical values for D=25 and M=40, the division uses 5000 clock cycles, which corresponds to approximately 0.005 MCPS.

For a length L of the filter, L filter taps generally exist. Multiplying each of the L filter taps by the gain factor $\beta_n$ utilizes L multiplications. Assume that the gain factor $\beta_n$ may be updated in only a fraction (e.g., 1/P) of the cases. (The gain factor $\beta_n$ may not be updated often because of the fast reconvergence implemented by the method 200.) Therefore, L*(8000/M)/P clock cycles may be used to update the filter taps for the 8 kHz signal. Assuming typical values of L=192, M=40 and P=8, the update may use approximately 4800 clock cycles, which corresponds to approximately 0.005 MCPS.

Therefore, the total MCPS used by the method 200 may be: 0.04+0.005+0.005=0.05 MCPS.

To verify the method 200 for fast echo gain change detection, the method 200 was generally implemented in a fixed point C code using 32-bit fixed point arithmetic. For testing, multiple sound files with a sampling frequency of 8 kHz, 16 bits per sample and pulse code modulation were selected.

Figure 6:
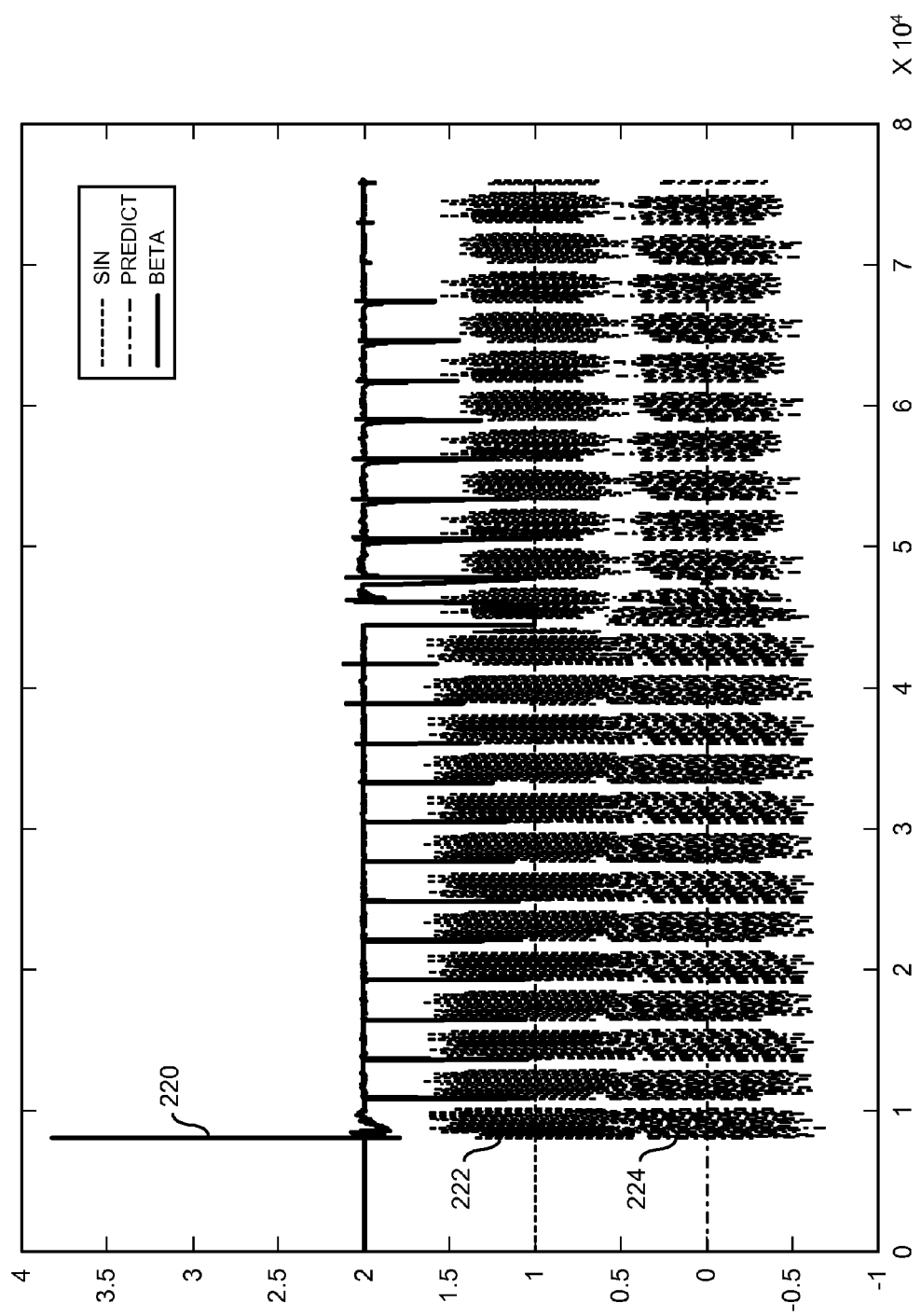
FIG. 6 is a graph of simulation results of the gain factor as a function of time with a particular smoothing factor.

Referring to FIG. 6, a graph of simulation results of the gain factor as a function of time with a particular smoothing factor are shown. A curve 220 may represent the gain factor $\beta_n$, (shifted up 2 units for clarity). A curve 222 may represent input samples in the signal SIN (shifted up 1 unit for clarity). A curve 224 may represent the predicted echo in the signal SYN_ECHO. The smoothing factor $\gamma$ is generally set at 10* $(35/2^{15})$.

Figure 7:
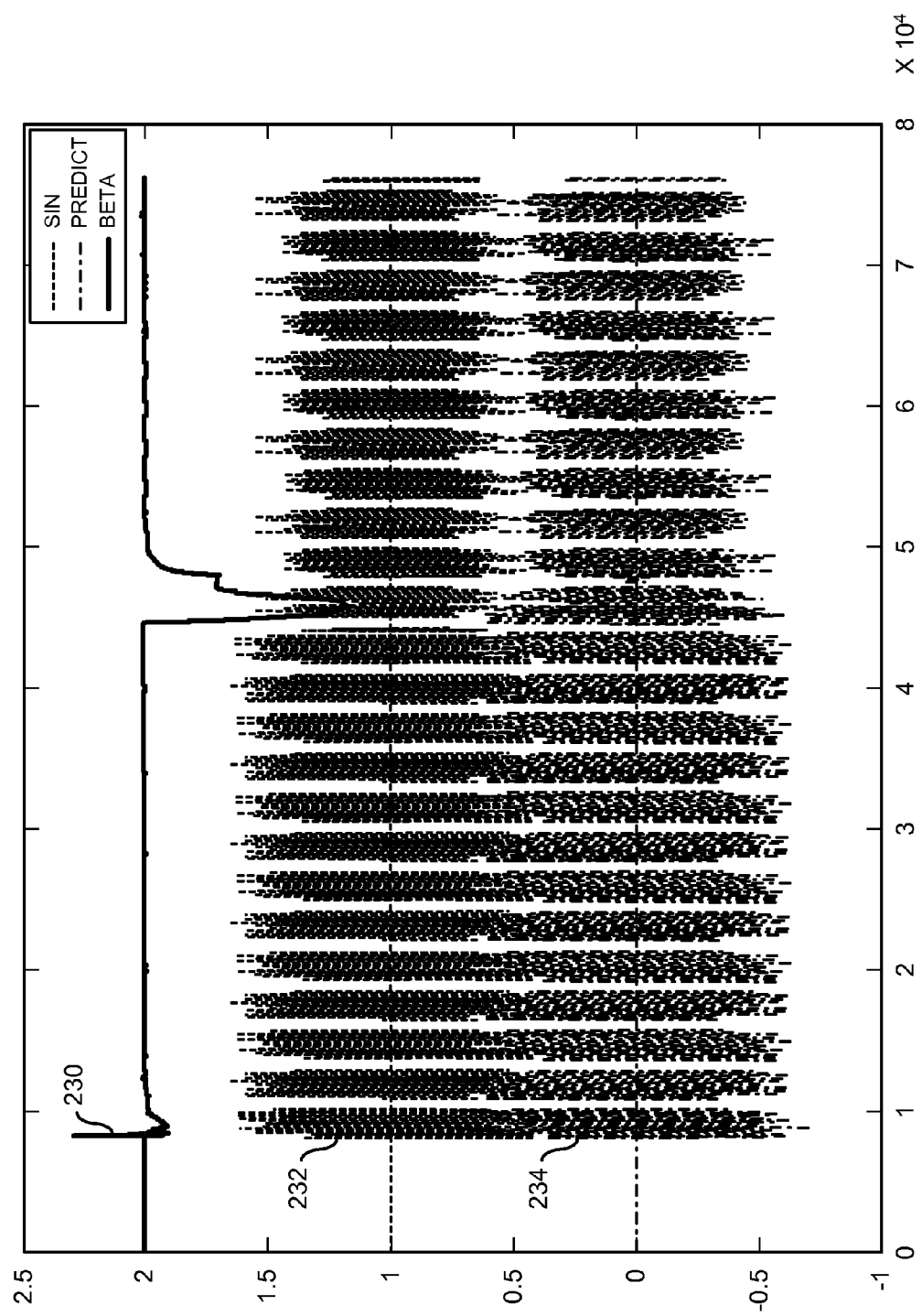
FIG. 7 is a graph of simulation results of the gain factor as a function of time with another smoothing factor.

Referring to FIG. 7, a graph of simulation results of the gain factor as a function of time with another smoothing factor are shown. A curve 230 may represent the gain factor $\beta_n$ (shifted up 2 units for clarity). A curve 232 may represent input samples in the signal SIN (shifted up 1 unit for clarity). A curve 234 may represent the predicted echo in the signal SYN_ECHO. The smoothing factor $\gamma$ is generally set at $(35/2^{15})$ As illustrated by FIGS. 6 and 7, the smoothing factor $\gamma$ generally affects a smoothness of the gain factor $\beta_n$ curve. Since the gain factor $\beta_n$ may be updated if $\beta_n$<TR1 or $\beta_n$>TR2, the curve 230 (see FIG. 7) is generally preferred over the curve 220 (see FIG. 6) to exclude false responses. Generally, a compromise may exist between large smoothing factors $\gamma$ (and possible false responses) and small smoothing factors $\gamma$ (and possible missing of the EGCD).

Some embodiments of the present invention generally provide a fast echo gain change detection method (or approach). The fast echo gain change detection method may provide a theoretical optimal solution based on a least-squares method and a practical implementation with approximation using an IIR method (e.g., also called an exponential windowing technique). The method may provide flexible tuning in terms of what frames of an input signal are generally used. EGCD decision making of the method is generally based on simple threshold logic. Instead of running a full EPC procedure, the method may multiply the filter vector by the gain factor. A delay in the EGCD decision making may be small compared with existing methods. The method generally has low complexity in terms of number of processing cycles. Furthermore, the method may enable a fixed point implementation on a processor.

The system 100 may be operable to perform network and acoustic echo cancellation, channel equalization, noise reduction and/or echo gain change detection. The circuits 102, 104 and 106 may be implemented as part of land-line telephones, cellular telephones, hands-free telephones, teleconference systems and/or IP telephony.

The functions performed by the diagram of FIG. 5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 1-3 represent logical data flows. The logical data flows are generally representative of physical data transferred between the respective blocks by, for example, address, data, and control signals and/or busses. The system represented by the apparatus 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit configured to synthesize a first vector by filtering a second vector based on a third vector; and
a second circuit configured to (i) generate a gain corresponding to a fourth vector, said fourth vector being received from a network as an echo of said second vector, (ii) compare said gain to a plurality of thresholds and (iii) update said third vector as a function of said gain where said compare determines that said gain is not between said thresholds.

2. The apparatus according to claim 1, wherein said second circuit is further configured to (i) update a first value in response to a product of (a) a component of said fourth vector and (b) a component of said first vector and (ii) update a second value in response to a square of said component of said first vector.

3. The apparatus according to claim 2, wherein said gain is generated as a division of said first value by said second value.

4. The apparatus according to claim 2, wherein said first value and said second value are updated once per each of a plurality of said components of said fourth vector.

5. The apparatus according to claim 1, wherein said gain is generated as a division of (i) a summation of a plurality of products of a plurality of components of said fourth vector and a plurality of components of said first vector by (ii) a summation of a plurality of squares of said components of said first vector.

6. The apparatus according to claim 5, wherein said division is performed once per each of a plurality of frames of said fourth vector.

7. The apparatus according to claim 1, wherein said updating of said third vector comprises multiplying a plurality of taps of said filtering by said gain.

8. The apparatus according to claim 1, wherein said third vector comprises a model of an echo path of said network.

9. The apparatus according to claim 1, wherein said second vector comprises a plurality of samples transmitted on said network.

10. The apparatus according to claim 1, wherein said apparatus is implemented as one or more integrated circuits.

11. A method for fast gain change detection of an echo in a network, comprising the steps of:
(A) synthesizing a first vector by filtering a second vector based on a third vector;
(B) generating a gain corresponding to a fourth vector, said fourth vector being received from said network as said echo of said second vector;
(C) comparing said gain to a plurality of thresholds; and
(D) updating said third vector as a function of said gain where said comparing determines that said gain is not between said thresholds.

12. The method according to claim 11, further comprising the steps of:
updating a first value in response to a product of (i) a component of said fourth vector and (ii) a component of said first vector; and
updating a second value in response to a square of said component of said first vector.

13. The method according to claim 12, wherein said gain is generated as a division of said first value by said second value.

14. The method according to claim 12, wherein said first value and said second value are updated once per each of a plurality of said components of said fourth vector.

15. The method according to claim 11, wherein said gain is generated as a division of (i) a summation of a plurality of products of a plurality of components of said fourth vector and a plurality of components of said first vector by (ii) a summation of a plurality of squares of said components of said first vector.

16. The method according to claim 15, wherein said division is performed once per each of a plurality of frames of said fourth vector.

17. The method according to claim 11, wherein said updating of said third vector comprises multiplying a plurality of taps of said filtering by said gain.

18. The method according to claim 11, wherein (i) said second vector comprises a plurality of samples transmitted on said network and (ii) said third vector comprises a model of an echo path of said network.

19. The method according to claim 11, further comprising the step of:
multiplying said first vector by said gain.

20. An apparatus comprising:
means for synthesizing a first vector by filtering a second vector based on a third vector;
means for generating a gain corresponding to a fourth vector, said fourth vector being received from a network as an echo of said second vector;
means for comparing said gain to a plurality of thresholds; and
means for updating said third vector as a function of said gain where said comparing determines that said gain is not between said thresholds.

* * * * *